(12) United States Patent
Hung

(10) Patent No.: US 12,446,814 B2
(45) Date of Patent: Oct. 21, 2025

(54) SYSTEM AND METHOD FOR GENERATING OCCLUSAL LOADING BASED ON SIMULATED HUMAN INGESTION ACTIONS

(71) Applicant: Cheng-Hsiang Hung, New Taipei (TW)

(72) Inventor: Cheng-Hsiang Hung, New Taipei (TW)

( * ) Notice: Subject to any disclaimer, the term of this patent is extended or adjusted under 35 U.S.C. 154(b) by 807 days.

(21) Appl. No.: 17/751,533

(22) Filed: May 23, 2022

(65) Prior Publication Data

US 2022/0378350 A1 Dec. 1, 2022

Related U.S. Application Data

(60) Provisional application No. 63/192,686, filed on May 25, 2021.

(51) Int. Cl.
*A61B 5/22* (2006.01)
*A61B 5/00* (2006.01)

(52) U.S. Cl.
CPC .............. *A61B 5/228* (2013.01); *A61B 5/682* (2013.01)

(58) Field of Classification Search
CPC ....... A61B 5/228; A61B 5/682; A61B 5/4547; A61C 19/04; A61C 7/08; A61C 7/008;
(Continued)

(56) References Cited

U.S. PATENT DOCUMENTS 5,030,098 A * 7/1991 Branford ................ A61H 23/00
433/229
5,492,452 A 2/1996 Kirsch et al.
(Continued)

FOREIGN PATENT DOCUMENTS

BR 9305364 A 7/1994
CA 2209498 A1 8/1996
(Continued)

OTHER PUBLICATIONS

European Patent Office, European Search Report No. 22175288.4, Oct. 10, 2022, Europe.
(Continued)

*Primary Examiner* — Jacqueline Cheng
*Assistant Examiner* — Tho Q Tran
(74) *Attorney, Agent, or Firm* — McClure, Qualey & Rodack, LLP

(57) ABSTRACT

A system for generating occlusal loading is provided, including a loading appliance and a controller. The loading appliance includes three load transmission elements and three actuators. The load transmission elements are adapted to be positioned between upper and lower anterior teeth of the patient and between upper and lower posterior teeth on the left and right sides of the patient's mouth, respectively. The load transmission elements are separated from each other. The actuators are coupled to the load transmission elements, respectively. The controller is configured to control the three actuators to actuate the three load transmission elements individually and sequentially, with a rest period between successive actions of the three load transmission elements, to transmit vibration energy from the three actuators to the patient's periodontal tissues of the anterior teeth, the left posterior teeth, and the right posterior teeth.

16 Claims, 8 Drawing Sheets

(58) Field of Classification Search
CPC ........... A61C 7/36; A61C 19/00; A61C 19/05; A61C 1/0007; A61C 19/045; A61C 19/052; A61C 19/06

See application file for complete search history.

(56) References Cited

U.S. PATENT DOCUMENTS

| | | | |
|---|---|---|---|
| 6,613,001 | B1 | 9/2003 | Dworkin |
| 8,226,581 | B2 | 7/2012 | Rampi et al. |
| 8,500,446 | B2 | 8/2013 | Lowe |
| 10,485,642 | B2 | 11/2019 | Ogawa |
| 11,712,325 | B2 | 8/2023 | Hung |
| 2011/0136070 | A1* | 6/2011 | Rubin ............... A61C 7/008 433/2 |
| 2011/0276312 | A1 | 11/2011 | Shalon et al. |
| 2015/0064640 | A1 | 3/2015 | Nobrega et al. |
| 2015/0173856 | A1* | 6/2015 | Lowe ............... A61C 7/00 433/2 |
| 2017/0304024 | A1* | 10/2017 | Nóbrega ............... A61C 7/002 |
| 2019/0117339 | A1 | 4/2019 | Bolzan |
| 2020/0069395 | A1* | 3/2020 | Chen ............... A61C 7/36 |
| 2020/0085536 | A1* | 3/2020 | Karami ............... H10N 30/20 |
| 2020/0093575 | A1* | 3/2020 | Way ............... A61C 7/008 |
| 2020/0345536 | A1* | 11/2020 | Letizia ............... A61B 5/4557 |
| 2020/0375697 | A1 | 12/2020 | Hung |
| 2021/0145629 | A1* | 5/2021 | Ghuge ............... A61B 5/682 |

FOREIGN PATENT DOCUMENTS

| | | | | |
|---|---|---|---|---|
| CN | 105748164 | A | 7/2016 | |
| CN | 109730796 | A | 5/2019 | |
| EP | 3409246 | A1 | 12/2018 | |
| EP | 3437585 | A1 * | 2/2019 | ............. A61C 7/008 |
| EP | 4458313 | A1 * | 11/2024 | ............. A61C 19/00 |
| JP | 2013123624 | A | 6/2013 | |
| JP | 2018118110 | A | 8/2018 | |
| JP | 2019013463 | A | 1/2019 | |
| JP | 2020110576 | A | 7/2020 | |
| JP | 2020-199251 | A | 12/2020 | |

OTHER PUBLICATIONS

Japanese language office action dated Oct. 17, 2023, issued in application No. JP 2022-084693.

Notice of Allowance dated Feb. 27, 2024, issued in application No. JP2022084693.

Notice of Allowance dated Nov. 28, 2023, issued in application No. EP 22175288.4.

* cited by examiner

SYSTEM AND METHOD FOR GENERATING OCCLUSAL LOADING BASED ON SIMULATED HUMAN INGESTION ACTIONS

CROSS REFERENCE TO RELATED APPLICATIONS

This application claims the benefit of U.S. Provisional Application No. 63/192,686, filed on May 25, 2021, the entirety of which is incorporated by reference herein.

BACKGROUND OF THE INVENTION

Field of the Invention

The present application relates in general to a system and method for generating occlusal loading on the teeth and periodontal tissue, and in particular to a system and method for generating occlusal loading on the teeth and periodontal tissue based on simulated human ingestion actions.

Description of the Related Art

Devices used in the prior art transfer vibration energy from an extraoral source to the teeth in the patient's mouth. For instance, a U-shaped bite plate with a vibration source can be placed in the patient's mouth, and the patient bites down on the bite plate and holds the device hands-free for twenty minutes each day.

Such prior-art vibration devices operate at frequency and amplitude ranges that may vary, claiming to enhance orthodontic tooth movement, to increase aligner fit, and to enhance bone remodeling around teeth. The idea is that dynamic loading or cyclic forces lead to greater bone remodeling than a static force, and tooth movement is accomplished by remodeling the surrounding alveolar bone. The step of bone formation in bone remodeling is the limiting factor in bone remodeling, and cyclic force can speed up bone formation.

In another example, a vibration device in the form of a stick can be held in place by being sandwiched between the upper and lower teeth. The vibrating stick can be moved to different locations to contact desired teeth. The device can be programmed to instruct the user to move the vibrating stick to specific teeth to deliver focused energy to those teeth.

The problem with bite plates requiring patients to bite down is that the force of the bite is not stable and can lead to muscle fatigue. Vibrating stick claims to use only gravity to affix the device. The forces being delivered to both jaws can be adjusted by changing the position of the stick and the position of tooth contact. The actual forces delivered also depend on how hard the patient is clenching on the stick. In addition, the vibration patterns of those existing vibration devices differ from the way human actually chew, which can easily cause patient discomfort and slow down tooth movement.

BRIEF SUMMARY OF INVENTION

In view of the above-mentioned conventional problems, an object the present invention is to provide a system and method that can generate vibrating forces simulating occlusal loading effects to the teeth and periodontal tissues in accordance with a patient's habitual sequence and durations for chewing and swallowing.

An embodiment of the invention provides a system for generating occlusal loading. The system includes a loading appliance and a controller. The loading appliance includes a first load transmission element, a second load transmission element, a third load transmission element, and three actuators. The first load transmission element is adapted to be positioned between upper and lower anterior teeth of the patient's mouth. The second and third load transmission elements are adapted to be positioned between upper and lower posterior teeth on the left and right sides of the patient's mouth, respectively. The first, second and third load transmission elements are separated from each other. The three actuators are coupled to the first, second and third load transmission elements, respectively. The controller is configured to control the three actuators to actuate the first, second and third load transmission elements individually and sequentially, with a rest period between successive actions of the first, second and third load transmission elements, to transmit vibration energy from the three actuators to the patient's periodontal tissues of the anterior teeth, the left posterior teeth, and the right posterior teeth.

In some embodiments, the system further includes a detection appliance. The detection appliance is configured to detect the sequence and duration of the patient's ingestion actions, including the cutting of food by the upper and lower anterior teeth, the chewing of food by the upper and lower posterior teeth on the left and right sides of the mouth, and the swallowing of food, and is configured to transmit the detection data to the controller, so that the controller controls the three actuators according to the detection data of the detection appliance in the absence of actual ingestion actions of the patient.

In some embodiments, the detection appliance is also configured to detect occlusal forces and frequencies of the upper and lower anterior teeth when cutting food and the upper and lower posterior teeth on the left and right sides of the mouth when chewing food.

In some embodiments, the loading appliance further includes a mouthpiece adapted to fit in a space between the patient's upper and lower dental arches and having a U-shaped structure that conforms to the shape of the upper and lower dental arches. The thickness of the mouthpiece gradually decreases from a mesial end to a distal end of the mouthpiece. The first, second and third load transmission elements are inserted into the mouthpiece and are spaced apart from each other.

In some embodiments, each of the first, second and third load transmission elements has a first portion extending into the mouthpiece and a second portion remaining outside the mouthpiece, wherein the three actuators are in contact with the second portions of the first, second and third load transmission elements, respectively, and each of the three actuators is a vibration motor.

In some embodiments, the three actuators and the second portions of the first, second and third load transmission elements are received in a casing embedding the controller, and one end of each of the second portions of the first, second and third load transmission elements is provided with a vibration absorbing mount.

In some embodiments, the loading appliance further includes a first teeth segment including an upper support and a lower support, adapted to fit in a space between the upper and lower anterior teeth, wherein the first load transmission element is configured to be inserted between the upper and lower supports of the first teeth segment; a second teeth segment including an upper support and a lower support, adapted to fit in a space between the upper and lower posterior teeth on the left side of the patient's mouth, wherein the second load transmission element is configured to be inserted between the upper and lower supports of the second teeth segment; and a third teeth segment including an upper support and a lower support, adapted to fit in a space between the upper and lower posterior teeth on the right side of the patient's mouth, wherein the third load transmission element is configured to be inserted between the upper and lower supports of the third teeth segment. The first, second and third teeth segments are separated from each other.

In some embodiments, each of the first, second and third load transmission elements is a shaft and has a pressure loading part in contact with the first, second or third teeth segment, wherein the three actuators are coupled to the three shafts, respectively.

In some embodiments, each of the actuators is a rotation motor, and the pressure loading part has an elliptical cross-section.

In some embodiments, each of the actuators is a rotation motor, and the pressure loading part has a circular cross-section with a protrusion.

In some embodiments, each of the actuators is a vibration motor.

In some embodiments, each of the first, second and third load transmission elements has a pressure loading part in contact with the first, second or third teeth segment, and each of the three actuators is located close to the respective pressure loading part.

Another embodiment of the invention provides a method for generating occlusal loading. The method includes: positioning three load transmission elements of a loading appliance between upper and lower anterior teeth of a patient's mouth, and between upper and lower posterior teeth on the left and right sides of the patient's mouth, respectively, wherein the three load transmission elements are separated from each other; and controlling three actuators by a controller to actuate the three transmission elements individually and sequentially, with a rest period between successive actions of the three load transmission elements, to transmit vibration energy from the three actuators to the patient's periodontal tissues of the anterior teeth, the left posterior teeth, and the right posterior teeth.

In some embodiments, the method further includes: detecting sequence and duration of the patient's ingestion actions, including the cutting of food by the upper and lower anterior teeth, the chewing of food by the upper and lower posterior teeth on the left and right sides of the mouth, and the swallowing of food, with a detection appliance; and transmitting detection data from the detection appliance to the controller, wherein the controller is configured to control the three actuators according to the detection data in the absence of actual ingestion actions of the patient.

In some embodiments, the detection appliance further detects occlusal forces and frequencies of the upper and lower anterior teeth when cutting food and the upper and lower posterior teeth on the left and right sides of the mouth when chewing food, and the detection data also includes the occlusal force and frequency of each ingestion action.

In some embodiments, the loading appliance further includes a mouthpiece adapted to fit in a space between the patient's upper and lower dental arches and having a U-shaped structure that conforms to the shape of the upper and lower dental arches, wherein the three load transmission elements are inserted into the mouthpiece and are spaced apart from each other.

In some embodiments, the loading appliance further includes three teeth segments adapted to fit in a space between the upper and lower anterior teeth, a space between the upper and lower posterior teeth on the left side of the patient's mouth and a space between the upper and lower posterior teeth on the right side of the patient's mouth, respectively, wherein the three teeth segments are separated from each other, wherein the three load transmission elements are in contact with the three teeth segments, respectively.

BRIEF DESCRIPTION OF DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF INVENTION

Figure 1:
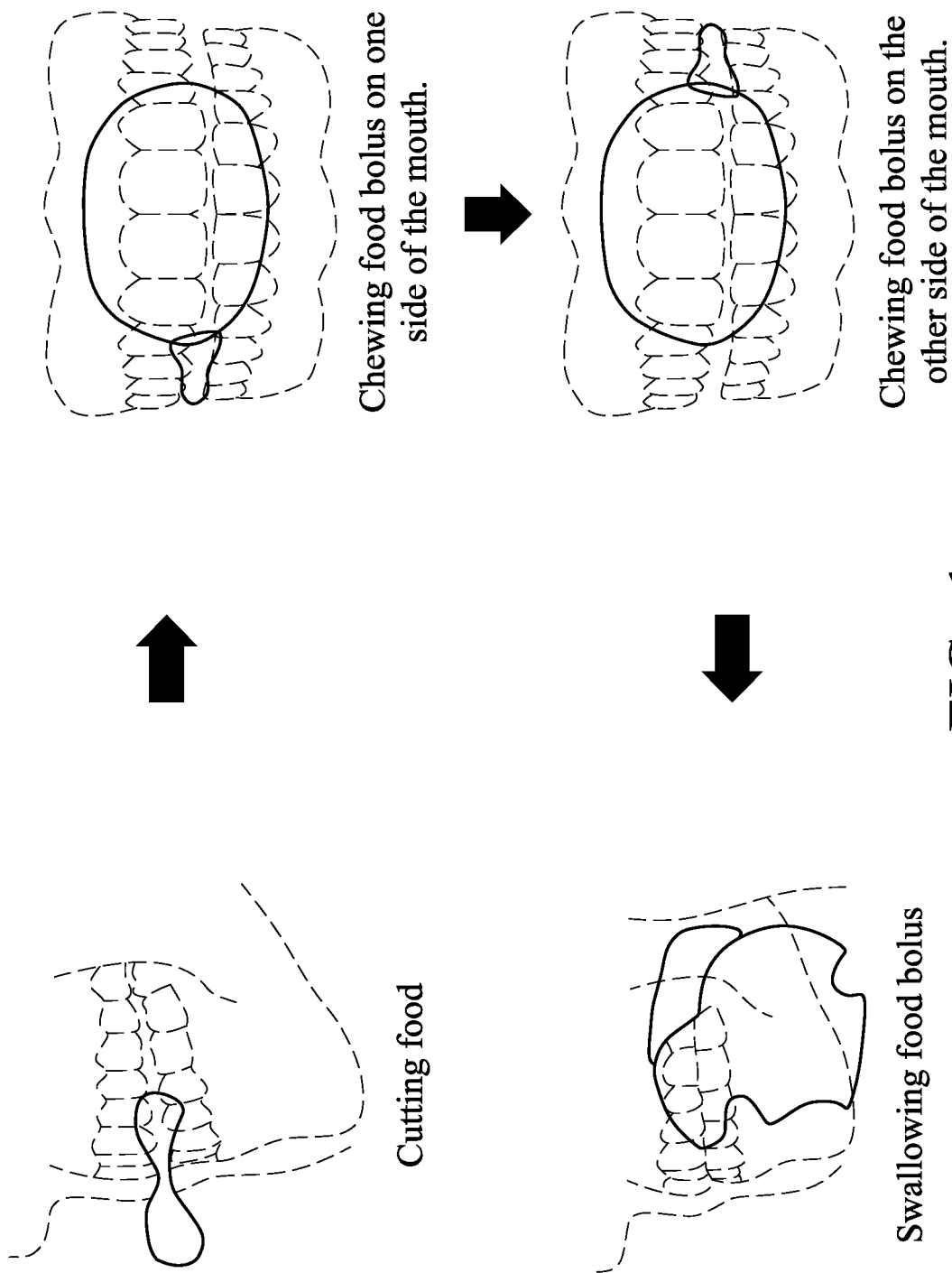
FIG. 1 is a schematic view illustrating the sequence of human ingestion actions.

Embodiments of a system and method for generating occlusal loading are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

The following embodiments relates to a system for generating the occlusal loading effects on the teeth and periodontal tissue due to simulated human ingestion actions, which controls the delivery of such loading according to the parameters obtained from detecting the sequence and timing of the said ingestion actions. Occlusal loading effects include those due to vibration. The advantages of such a system will be explained later. Some variations of the embodiments are described. Throughout the various views and illustrative embodiments, common elements use the same reference number.

Such a system includes a detection appliance and a loading appliance in accordance with some embodiments. First, the detection appliance detects the sequence and durations of ingestion actions, including the cutting of food by the anterior teeth, the chewing of food by the posterior teeth on the left and right sides of the dental arch, and the swallowing of food. A period of rest provides the time for swallowing. Then, the loading appliance simulates the occlusal loading effect on the periodontal tissue and alveolar bone due to these ingestion actions in the absence of actual ingestion.

The operation of the loading appliance is controlled by parameters obtained from the calculated sequence and durations of the ingestion actions detected by the detection appliance. When operated in this way, the loading appliance transmits vibration forces simulating occlusal loading effects to the periodontal tissues of the anterior teeth, the left posterior teeth, and the right posterior teeth separately in accordance with a patient's habitual sequence and durations for chewing and swallowing.

In general, human ingestion includes the actions of cutting the food, chewing the food on the left and right sides of the mouth and swallowing, as shown in FIG. 1. The normal sequence starts with the cutting of the food by the upper and lower anterior teeth, then the cut piece of food is moved by the tongue toward one side of the mouth to be chewed by the upper and lower molars and premolars. At the same time, occlusal loading on the periodontal tissues stimulates nerves which cause the salivary glands to secrete saliva. During mastication, the saliva is mixed with the chewed food to form a soft and smooth food bolus. The tongue acts to keep the food on one side of the mouth for a period of chewing and then moves the food to the other side for another period of chewing. Finally, the swallowing action sends the food bolus into the esophagus.

Some people might habitually chew food on one side of the mouth only before swallowing. During ingestion, the sequential order of left side chewing, right side chewing, and swallowing steps varies among patients. This is due to habits developed over time. Human chewing frequency varies from 1 Hz to 2 Hz, and chewing episodes varies from 13 sec. to 35 sec. Normal human chewing force on first molar varies from 30 N to 150 N, and maximum occlusal loads varies from 300 N to 800 N.

Thus, a system that simulates natural occlusal loading effects can first detect the ingestion habit of a patient and then use the obtained detection data to control the delivery of simulated occlusal loading effects to the periodontal tissue. It has been found that such a system (which may also be referred to as a vibration force generation system because the occlusal loading effects are caused by vibration sources), which mimics human chewing habits, is suitable for various dental applications (which will be described further later).

Figure 2:
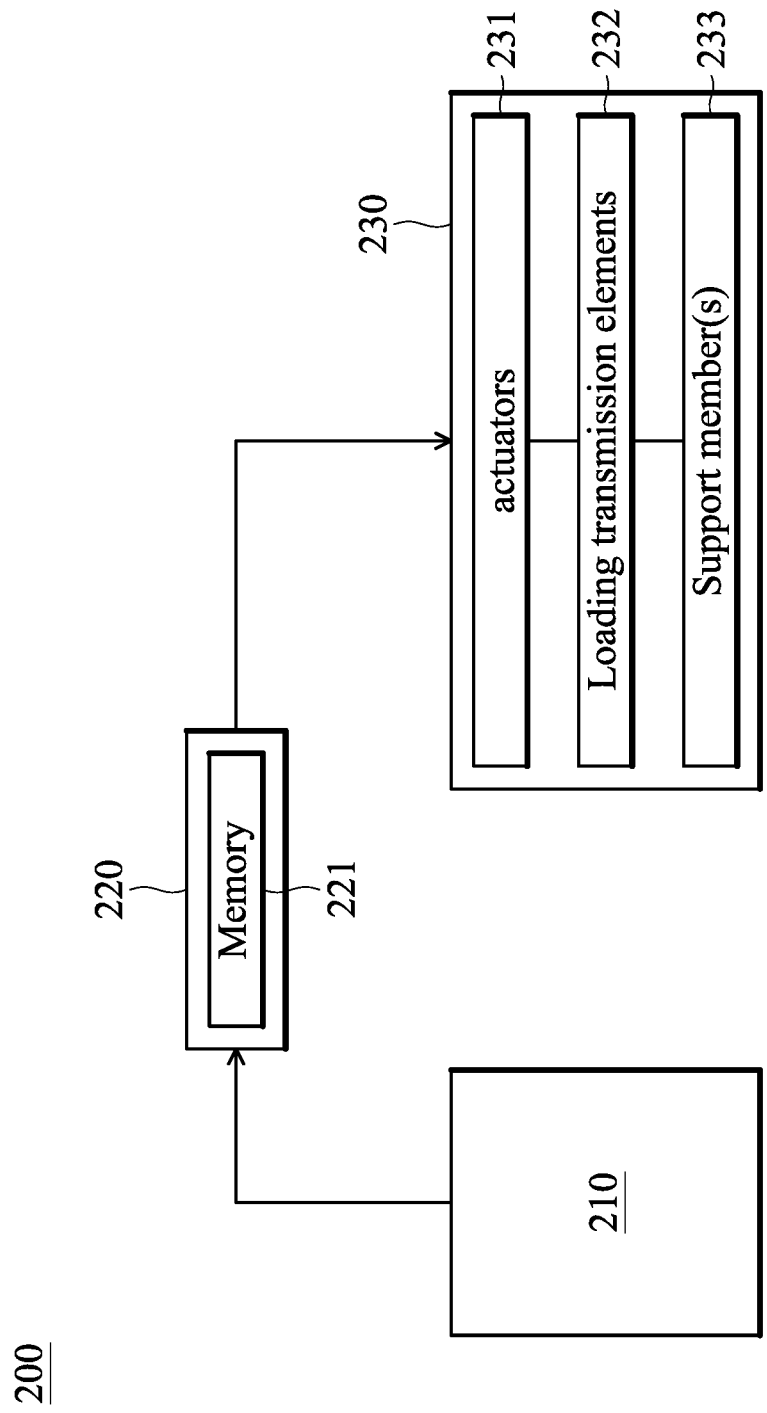
FIG. 2 is a block diagram illustrating a system for generating occlusal loading in accordance with some embodiments.

Referring to FIG. 2, which is a block diagram illustrating a system 200 for generating occlusal loading in accordance with some embodiments. The system 200 includes a detection appliance 210, a controller 220, and a loading appliance 230. Additional features or components can be added to the system 200, and/or some of the features described below can be replaced or eliminated in other embodiments.

The detection appliance 210 is used to detect the sequence and durations of ingestion actions, including the cutting of food by the anterior teeth, the chewing of food by the posterior teeth on the left and right sides of the dental arch, and the swallowing of food (as described above). In some embodiments, the detection appliance 210 is also used to detect the occlusal force and frequency of the upper and lower anterior teeth when cutting food, and the occlusal force and frequency of the upper and lower posterior teeth on the left and right sides of the mouth when chewing food. Various types of detection devices can be used.

In an example, the detection appliance 210 is an intraoral device with built-in pressure sensors. The detailed design of this intraoral device can refer to prior-arts such as U.S. Pat. No. 8,226,581 and U.S. Ser. No. 10/485,642. A detection method is to have the patient eat some food, chew, and swallow under regular conditions, and memorize the timing and movements of the jaw muscles. Then, without eating food, the detection appliance 210 is placed in the patient's mouth, and the patient is asked to repeat the memorized movements for the cutting, chewing and swallowing actions. The occlusal loading and frequency on the detection appliance 210 from these actions is detected and recorded by the pressure sensors, and the sequence and durations of these actions are calculated from the detected data, including the times for swallowing.

In another example, the detection appliance 210 is an extraoral device with a sensor that contacts the skin near the ear and the temporomandibular joint to detect the movement of the condyles during the ingestion actions. These actions are detected by analyzing the differences in condylar movements during ingestion. For example, when anterior teeth cut the food, both condyles tend to move together to perform the biting action. However, when chewing on one side of the mouth, the condyle on the working side will move differently than the condyle on the other side of the jaw. When swallowing, the upper and lower teeth tend to bite down together, and the tongue makes a pushing action at the same time. Such a detection appliance 210 records the movements of condyles and analyses the differences to determine the sequence and durations of the cutting, left side chewing, right side chewing, and swallowing actions. The detailed design of this extraoral device can refer to prior arts such as US20110276312A1.

In yet another example, the detection appliance 210 is an intraoral device that can be worn while eating food. For example, a masticatory appliance with embedded sensors can be worn during food ingestion to detect the cutting, chewing, and swallowing actions, to obtain detection data such as the sequence and durations of these actions, including the times for swallowing, as well as the occlusal loading and frequency of these actions. The detailed design of this intraoral device can refer to prior arts such as U.S. Pat. No. 6,613,001.

In other examples, the detection method of detection appliance 210 is based on taking a video clip of the patient while eating food. Video-based face detection and tracking technology has been used in medical diagnosis. The video clip is analyzed using the steps of facial feature recognition and motion tracking to detect the actions of ingestion. Using the timing information, the sequence and durations of the cutting, chewing, and swallowing actions can be calculated. For example, a mobile phone application controls the phone's camera to capture a video of the patient's face while ingesting food. The movements of the patient's facial features are then analyzed to determine the sequence and durations of the patient's ingestion actions. Finally, these detection data are sent via wired or wireless means to the controller 220.

The controller 220 obtains control parameters according to the detection data (may be detected by one or a combination of the above devices or methods) from the detection appliance 210, for example, by processing (e.g., signal conversion, calculation, etc.) and analyzing the detection data, and then controlling the separate load transmission elements 232 (which will be described below) of loading appliance 230 according to the control parameters. The control parameters may include the sequence and durations of the simulated ingestion actions to be performed by the loading appliance 230, and the occlusal loading and frequency of each action of simulated ingestion. The control parameters are selected to enable the loading appliance 230 to simulate the occlusal loading effect on the periodontal tissue and alveolar bone due to these ingestion actions in the absence of actual ingestion.

In some embodiments, the controller 220 is a computer device including a processing unit (not shown) and a memory unit 221. The processing unit can be implemented in numerous ways, such as with dedicated hardware, or with general-purpose hardware (e.g., a single processor, multiple processors or other suitable circuit components capable of parallel computations, etc.) that is programmed using microcode or software instructions to perform the functions recited herein. The memory unit 221 may be a read only memory (ROM), a random access memory (RAM), or the like. Further details of the controller 220 are well known to those in the art, and thus will not be described here.

The loading appliance 230 is used to simulate the occlusal loading effects on the periodontal tissue and alveolar bone of the anterior teeth, the left posterior teeth, and the right posterior teeth separately due to simulated actions of ingestion that is produced by vibration sources (controlled by the controller 220). Said loading appliance 230 transmits vibrating forces according to the detected sequence and durations of ingestion actions, including the cutting of food by the anterior teeth, the chewing of food by the posterior teeth on the right side, the chewing of food by the posterior teeth on the left side, and the swallowing of the food bolus. Also, said loading appliance 230 transmits vibrating forces according to the detected occlusal force and frequency of the ingestion actions.

In some applications, a loading appliance 230 using average values of a patient's detected pattern is used to provide therapy. This therapeutic application may be beneficial to a patient with a deteriorated chewing function. The goal of the therapy is to stimulate or excite more neurological responses in the brain.

In some applications, average values of detected patterns for many patients are used for the control parameters. In this case, the loading appliance 230 is used to treat or adjust the chewing habits of a patient with an abnormal pattern developed over time (i.e., to train a patient to adopt a different ingestion habit which can be an improvement over the previous habit).

In some applications, wearing a loading device 230 accelerates tooth movement during an orthodontic treatment. This is based on the following theory of tooth movement. Pressure on the periodontal tissue due to occlusal forces is distributed to the surrounding alveolar bone via the hydrostatic pressure effect. The distributed forces from adjacent teeth ultimately meet and collide in the cancellous bone region of the interdental alveolar bone, causing bone microfractures in that region. These microfractures enable an acceleration of tooth movement.

In some embodiments, the loading appliance 230 includes actuators 231 (i.e., vibration sources), load transmission elements 232, and one or more support members 233, as shown in FIG. 2. Examples of various configurations of the loading appliance 230 are presented below.

Figure 3:
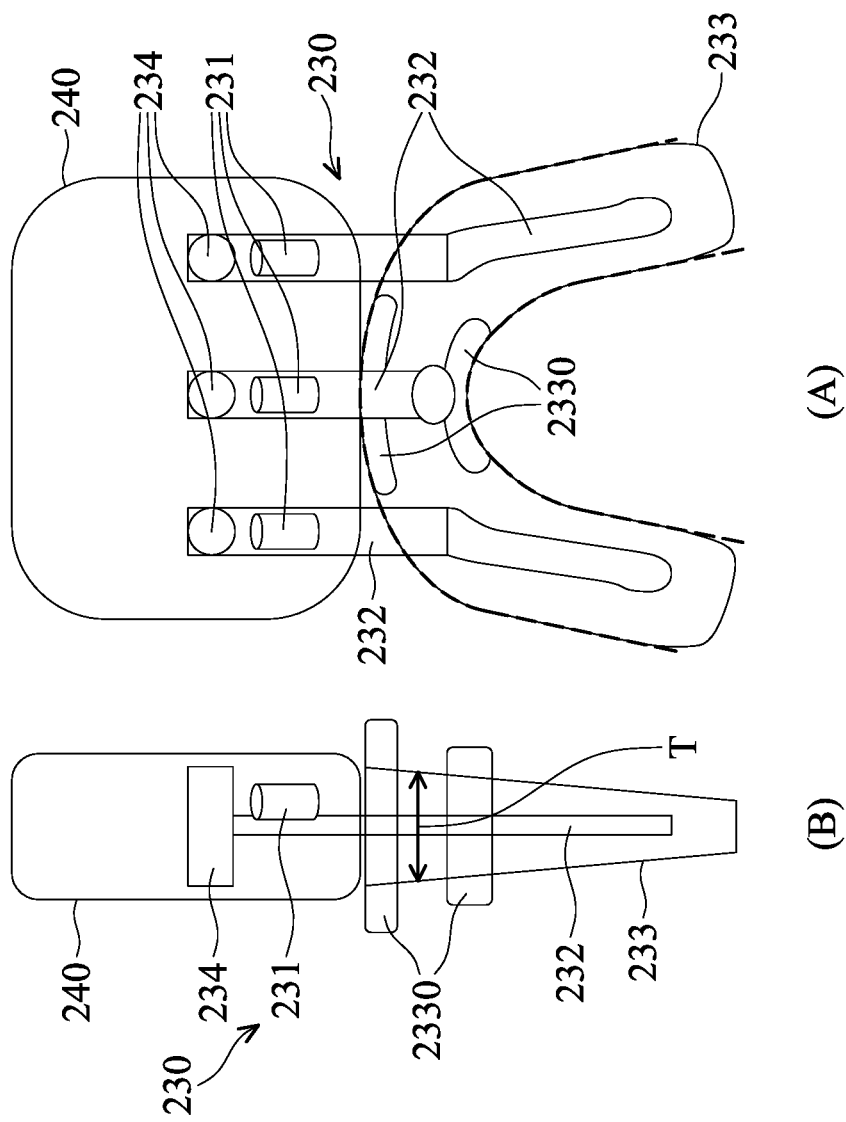
FIG. 3 illustrates a plan view and a cross-sectional view of a loading appliance in accordance with some embodiments.

FIG. 3 illustrates a plan view (see FIG. 3(A)) and a cross-sectional view (see FIG. 3(B)) of a loading appliance 230 in accordance with some embodiments. In the example of FIG. 3, the loading appliance 230 includes three actuators 231, three load transmission elements 232, and a support member 233.

Figure 4:
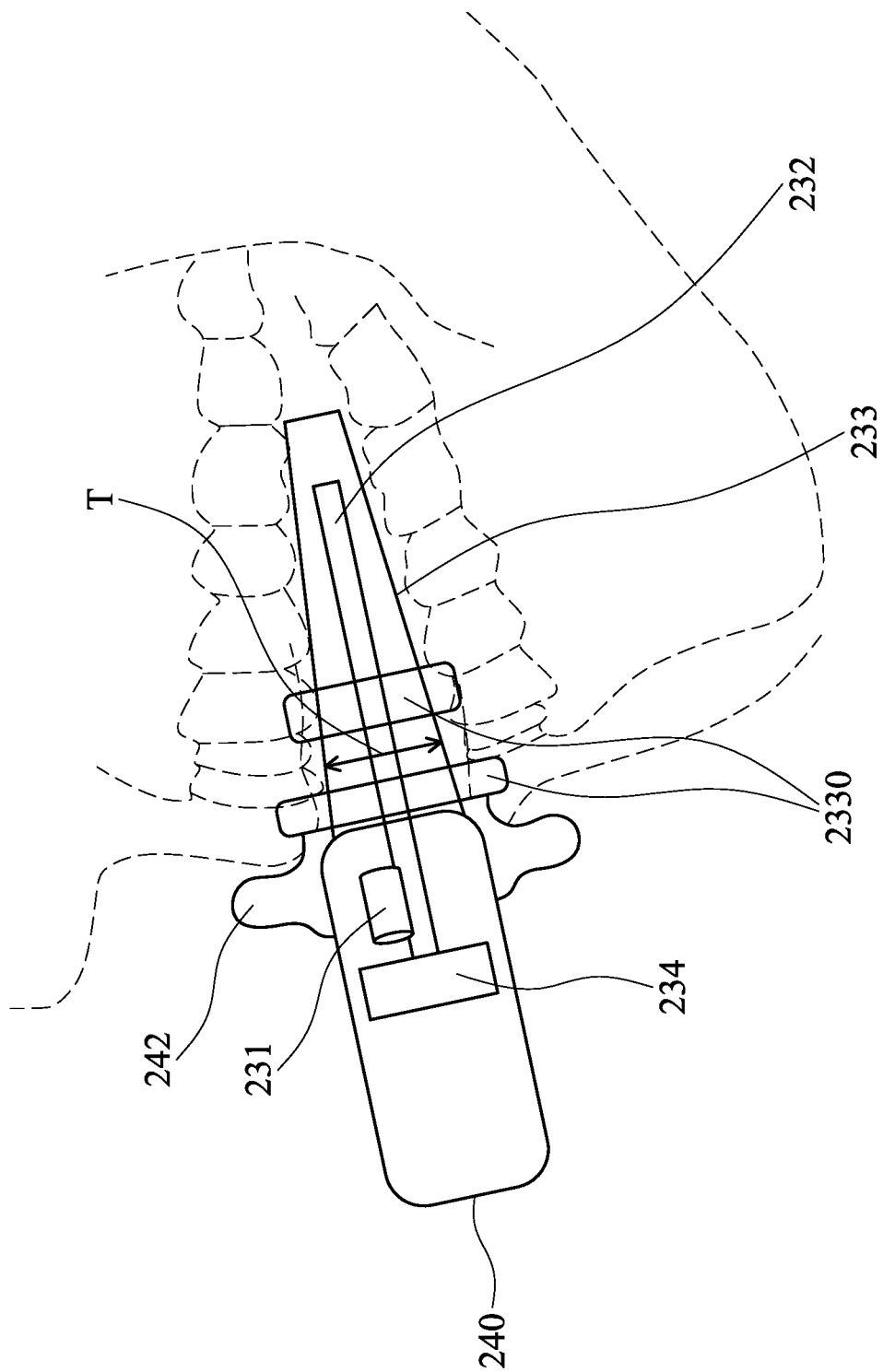
FIG. 4 is a schematic view illustrating a patient wearing the loading appliance of FIG. 3.

The support member 233 is a mouthpiece adapted to fit in a space between the patient's upper and lower dental arches (see FIG. 4) and having a U-shaped structure that conforms to the shape of the dental arches. Also, two limiting structures 2330 protrude from the upper and lower surfaces of the mouthpiece and are arranged along the inner and outer edges of the anterior teeth region of the mouthpiece. When the limiting structures 2330 is placed in the mouth, the patient's upper and lower anterior teeth can be positioned between the two limiting structures 2330 (as shown in FIG. 4), which helps prevent the support member 233 from slipping while wearing (i.e., improving wearing stability). In some embodiments, the thickness T of the mouthpiece gradually decreases from a mesial end (i.e., front end) to a distal end (i.e., rear end) of the mouthpiece, as shown in FIG. 3(B) and FIG. 4. Accordingly, when the support member 233 is placed in the mouth, it acts as a prop to keep the jaw open, which allows the patient to rest the jaw muscles while maintaining the position. The support member 233 may be made of a silicone material suitable for intraoral dental use.

The three load transmission elements 232 may be elongated flat plates (e.g., made of metals such as stainless steel, titanium alloy, or other suitable rigid material), and may be detachably inserted into the support member 233 from the front side thereof. The three load transmission elements 232 are separated from each other and positioned corresponding to the anterior teeth region, the right posterior teeth region and the left posterior teeth region of the support member 233, respectively. The three actuators 231 are respectively coupled to (e.g., contact) the three load transmission elements 232, to provide vibrating forces to actuate the load transmission elements 232 separately. In this example, each of the actuators 231 is a vibration motor such as an eccentric weight motor. However, other suitable vibration actuators can also be used.

Through the above configuration, the separate load transmission elements 232 (and their corresponding actuators 231) can simulate the occlusal loading effects (i.e., generate vibrating forces) on the periodontal tissue and alveolar bone of the anterior teeth, the left posterior teeth, and the right posterior teeth separately and sequentially, with a rest period between successive actions of the load transmission elements 232 (and after all actions), under the control of the controller 220.

In some embodiments, each of the load transmission elements 232 has a first portion extending into the support member 233 and a second portion remaining outside the support member 233, as shown in FIG. 3. The three actuators 231 are in contact with the second portions of the three load transmission elements 232, respectively. Moreover, the actuators 231 and the second portions of the load transmission elements 232 are received in a casing 240 embedding the controller 220 and/or other components such as a battery (not shown in FIG. 3). The casing 240 may also have a display, buttons etc. (not shown) on its outside surface to facilitate patient operation. In this example, one end of each load transmission element 232 close to the corresponding actuator 231 is also provided with a vibration absorbing mount (e.g., with an elastic spring or another suitable vibration damper) to reduce vibration interference between the load transmission elements 232. In addition, FIG. 4 also illustrates that a shielding member 242 (e.g., made of rubber) may be installed at the interface between the casing 240 and the support member 233 to prevent saliva from entering the casing 240.

Many variations and/or modifications can be made to embodiments of the disclosure. For example, the support member 233 is not limited to the mouthpiece illustrated in FIGS. 3 and 4, and it may include multiple separate teeth segments, such as a first teeth segment (which may also be referred to as anterior teeth segment), a second teeth segment (which may also be referred to as left posterior teeth segment), and a third teeth segment (which may also be referred to as right posterior teeth segment) that are adapted to fit in a space between the upper and lower anterior teeth, a space between the upper and lower posterior teeth on the left side of the patient's mouth, and a space between the upper and lower posterior teeth on the right side of the patient's mouth, respectively.

Each of the first, second and third teeth segments (i.e., three support members 233) may include an upper support 233U for supporting the upper teeth and a lower support 233L for supporting the lower teeth (see FIG. 5 or FIG. 6, for example), where the upper support 233U and the lower support 233L may be separate parts or integrally in one-piece. The three load transmission elements 232 are in contact with the first, second and third teeth segments, respectively, for example, each load transmission element 232 is inserted between the upper support 233U and the lower support 233L of the respective teeth segment.

Figure 5:
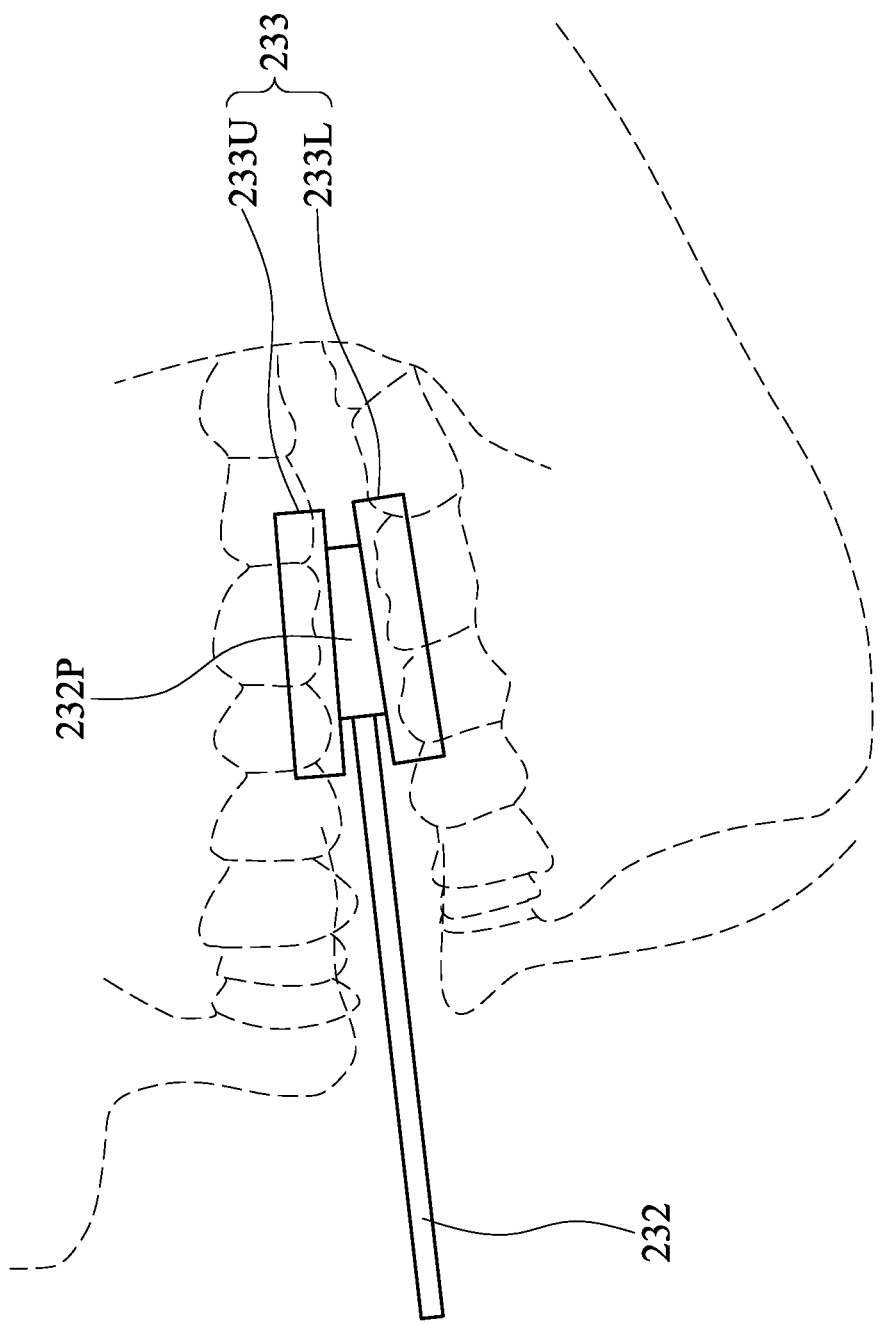
FIG. 5 is a schematic view illustrating a load transmission element for a posterior teeth segment in accordance with some embodiments.

In addition, each of the load transmission elements 232 can have various implementations. In the example of FIG. 5, the load transmission element 232 is a shaft and has a pressure loading part 232P in contact with the respective teeth segment (support member 233), for example, the pressure loading part 232P is inserted or positioned between the upper support 233U and the lower support 233L of the respective teeth segment. One end of the shaft opposite to the pressure loading part 232P is coupled to an actuator 231 (not shown) such as a vibration motor or a rotation motor. In this way, the rotating shaft rotates the pressure loading part 232P, or the vibrating shaft vibrates the pressure loading part 232P, thereby generating vibrating forces to the upper and lower teeth and the periodontal tissues through the corresponding teeth segment.

Figure 6:
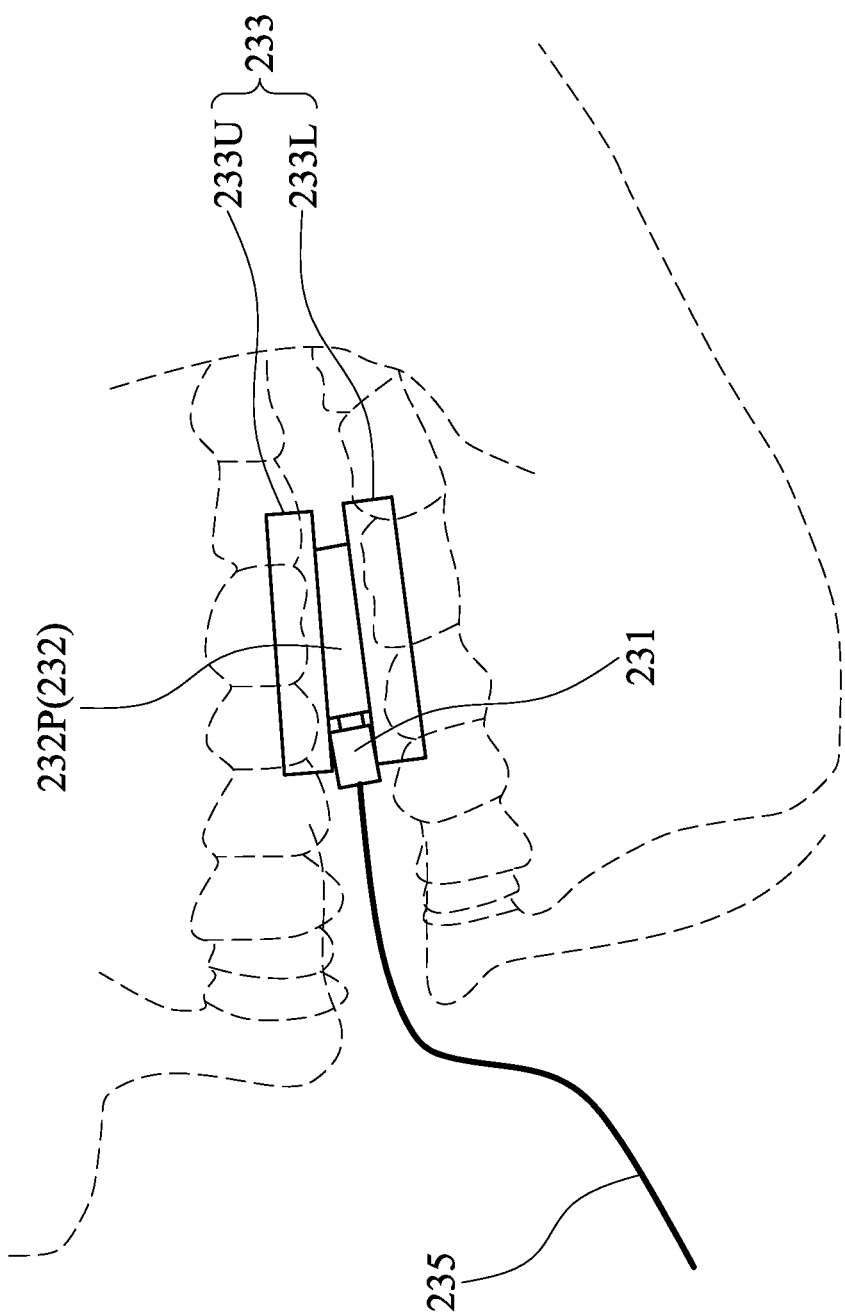
FIG. 6 is a schematic view illustrating a load transmission element for a posterior teeth segment in accordance with some embodiments.

In the example of FIG. 6, the actuator 231 (e.g., a vibration motor or a rotation motor) is disposed close to the pressure loading part 232P, and a power control wire 235 connects the actuator 231 to an extraoral controller 220 (see FIG. 2). The intraoral actuator 231 can either rotate or vibrate to actuate the load transmission element 232.

Figure 7:
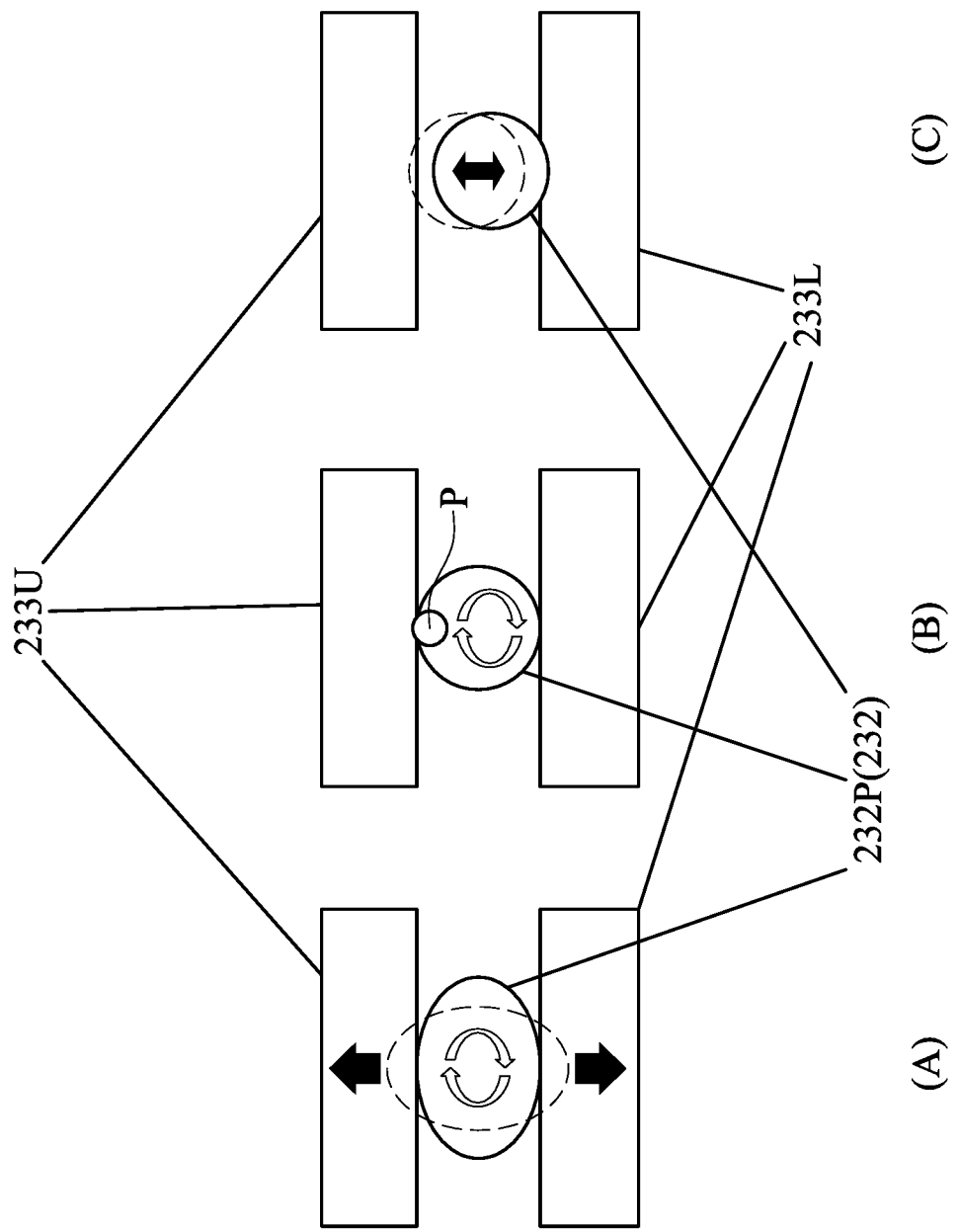
FIG. 7 illustrates cross-sectional views of different configurations of pressure loading parts and how they function in accordance with some embodiments.

FIG. 7 illustrates cross-sectional views of different configurations of pressure loading parts 232P and how they function in accordance with some embodiments.

In the example of FIG. 7(A), the pressure loading part 232P has an elliptical cross section. When rotated, the elliptical cross sectioned pressure loading part 232P pushes apart the upper and lower supports 233U and 233L at the same time in the directions shown by the solid arrows. The dashed outline shows the position of the pressure loading part 232P after turning 90 degrees. At this point, the loading is at maximum. From zero to 90 degrees, the pressure increases gradually; and from 90 to 180 degrees, the pressure decreases.

More specifically, initially, the upper and lower teeth rest on the loading appliance (not biting down on the loading appliance, so the masticatory muscles are relaxed). Occlusal pressure on the upper and lower teeth is gradually increased at the same time to push them apart. After reaching the maximum pressure point, the occlusal pressure is gradually decreased until the teeth return to the initial rest positions. It has been recognized that the loading appliance applies occlusal loading effects to the upper and lower teeth at the same time is a more natural way and more comfortable for the patient.

In the example of FIG. 7(B), the pressure loading part 232P has a circular cross-section with a protrusion. When rotated, the pressure loading part 232P strikes the upper and lower supports 233U and 233L in turn. In the example of FIG. 7(C), the circular cross sectioned pressure loading part 232P that vibrates in a vertical direction (e.g., driven by a vibrating motor) to strike the upper and lower supports 233U and 233L in turn. It should be understood that although the pressure loading parts 232P (or load transmission elements 232) in FIG. 7(B) and FIG. 7C strikes the upper and lower teeth at different times, they can still be used to simulate the occlusal loading effects on the periodontal tissue and alveolar bone.

Figure 8:
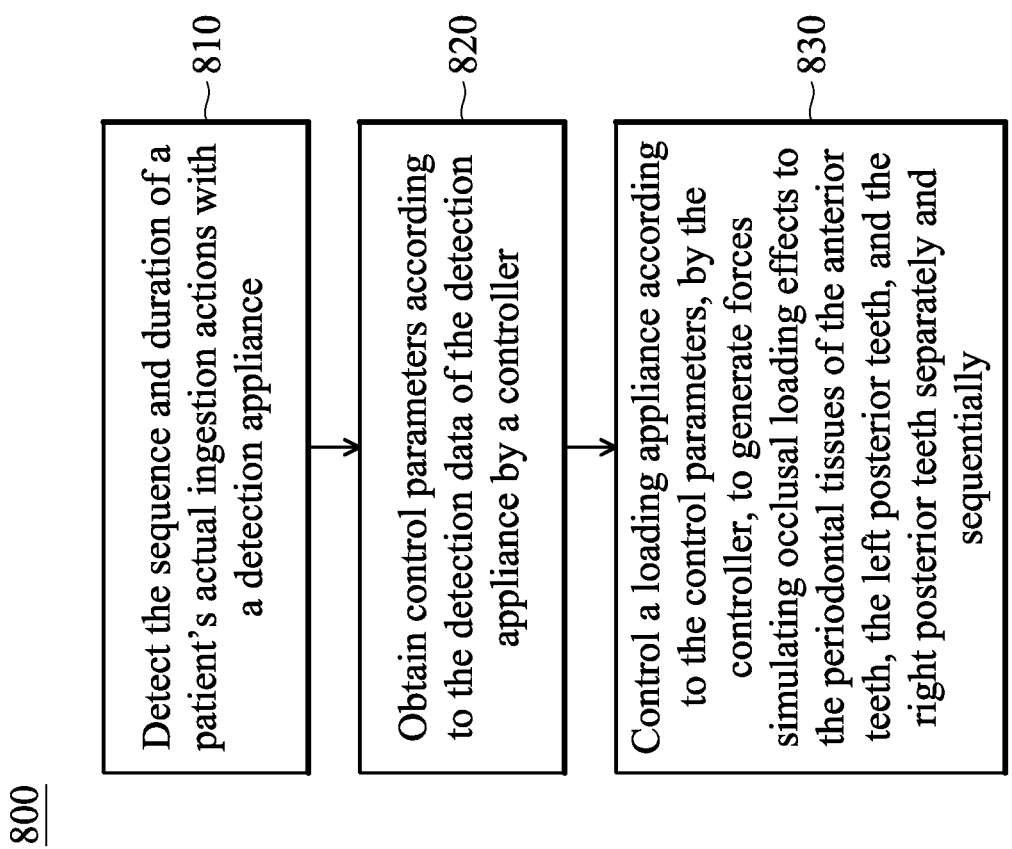
FIG. 8 illustrates a flow chart of a method for generating occlusal loading in accordance with some embodiments.

FIG. 8 illustrates a flow chart of a method 800 for generating occlusal loading in accordance with some embodiments. The method 800 begins at operation 801, in which the sequence and duration of a patient's actual ingestion actions are detected by a detection appliance 210 (see FIG. 2, for example). In some embodiments, the detection appliance 210 also detects the occlusal forces and frequencies of the upper and lower anterior teeth when cutting food and the upper and lower posterior teeth on the left and right sides of the mouth when chewing food. The method 800 then proceeds to operation 802, in which a controller 220 (see FIG. 2, for example) obtains the control parameters according to the detection data of the detection appliance 210. Finally, the method 800 proceeds to operation 803, in which the controller 220 controls a loading appliance 230 (see FIGS. 2 and 3, for example) according to the control parameters to generate forces simulating occlusal loading effects to the periodontal tissues of the anterior teeth, the left posterior teeth, and the right posterior teeth separately and sequentially.

Note that in some cases where the loading appliance 230 is used to treat or adjust the chewing habits of a patient with an abnormal pattern developed over time, average values of ingestion patterns for many patients are used for the control parameters. Since these control parameters (e.g., the sequence and timing of simulated ingestion actions, and the occlusal force and frequency of each simulated ingestion action) can also be set directly by the dentist on the controller 220, so the detection operation (for the actual ingestion actions) can be omitted.

In summary, embodiments of the present disclosure provide a system and method that can generate occlusal loading effects on the teeth and periodontal tissue based on simulated human ingestion actions. The occlusal loading effects include those due to vibration. Since the vibration pattern provided is more consistent with the way human actually chew, it is less uncomfortable for the patient and can speed up the movement of the tooth. Moreover, the disclosed system and method are also applicable to many other dental applications such as treating or adjusting the patient's chewing habits, in addition to the accelerating tooth movement.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A system for generating occlusal loading, comprising:
   a loading appliance, comprising:
      a mouthpiece adapted to fit in a space between a patient's upper and lower dental arches and having a U-shaped structure that conforms to the shape of the upper and lower dental arches;
      a first load transmission element adapted to be positioned between upper and lower anterior teeth of the patient's mouth;
      a second load transmission element and a third load transmission element adapted to be positioned between upper and lower posterior teeth on the left and right sides of the patient's mouth, respectively, wherein the first, second and third load transmission elements are inserted into the mouthpiece and are separated from each other, wherein each of the first, second and third load transmission elements has a first portion extending into the mouthpiece and a second portion remaining outside the mouthpiece; and
      three actuators coupled to the first, second and third load transmission elements, respectively, wherein the three actuators are in contact with the second portions of the first, second and third load transmission elements, respectively; and
   a controller configured to control the three actuators to actuate the first, second and third load transmission elements individually and sequentially, with a rest period between successive actions of the first, second and third load transmission elements, to transmit vibration energy from the three actuators to the patient's periodontal tissues of the anterior teeth, the left posterior teeth, and the right posterior teeth.

2. The system as claimed in claim 1, further comprising:
   a detection appliance configured to detect sequence and duration of the patient's ingestion actions, including the cutting of food by the upper and lower anterior teeth, the chewing of food by the upper and lower posterior teeth on the left and right sides of the mouth, and the swallowing of food, and configured to transmit detection data to the controller, wherein the controller is configured to controls the three actuators according to the detection data of the detection appliance in the absence of actual ingestion actions of the patient.

3. The system as claimed in claim 2, wherein the detection appliance is also configured to detect occlusal forces and frequencies of the upper and lower anterior teeth when cutting food and the upper and lower posterior teeth on the left and right sides of the mouth when chewing food.

4. The system as claimed in claim 1,
   wherein a thickness of the mouthpiece gradually decreases from a mesial end to a distal end of the mouthpiece.

5. The system as claimed in claim 1, wherein each of the three actuators is a vibration motor.

6. The system as claimed in claim 1, wherein the three actuators and the second portions of the first, second and third load transmission elements are located in a casing embedding the controller, and one end of each of the second portions of the first, second and third load transmission elements is provided with a vibration absorbing mount.

7. The system as claimed in claim 1, wherein the loading appliance further comprises:
   a first teeth segment including an upper support and a lower support, adapted to fit in a space between the upper and lower anterior teeth, wherein the first load transmission element is configured to be inserted between the upper and lower supports of the first teeth segment;
   a second teeth segment including an upper support and a lower support, adapted to fit in a space between the upper and lower posterior teeth on the left side of the patient's mouth, wherein the second load transmission element is configured to be inserted between the upper and lower supports of the second teeth segment; and
   a third teeth segment including an upper support and a lower support, adapted to fit in a space between the upper and lower posterior teeth on the right side of the patient's mouth, wherein the third load transmission element is configured to be inserted between the upper and lower supports of the third teeth segment,
   wherein the first, second and third teeth segments are separated from each other.

8. The system as claimed in claim 7, wherein each of the first, second and third load transmission elements is a shaft and has a pressure loading part in contact with the first, second or third teeth segment, wherein the three actuators are coupled to the three shafts, respectively.

9. The system as claimed in claim 8, wherein each of the actuators is a rotation motor, and the pressure loading part has an elliptical cross-section.

10. The system as claimed in claim 8, wherein each of the actuators is a rotation motor, and the pressure loading part has a circular cross-section with a protrusion.

11. The system as claimed in claim 8, wherein each of the actuators is a vibration motor.

12. The system as claimed in claim 7, wherein each of the first, second and third load transmission elements has a pressure loading part in contact with the first, second or third teeth segment, and each of the three actuators is located close to the respective pressure loading part.

13. A method for generating occlusal loading, comprising:
- detecting sequence and duration of a patient's ingestion actions, including the cutting of food by upper and lower anterior teeth, the chewing of food by upper and lower posterior teeth on the left and right sides of the patient's mouth, and the swallowing of food, with a detection appliance;
- positioning three load transmission elements of a loading appliance between the upper and lower anterior teeth of the patient's mouth, and between the upper and lower posterior teeth on the left and right sides of the patient's mouth, respectively, wherein the three load transmission elements are separated from each other;
- transmitting detection data from the detection appliance to a controller, wherein the controller is configured to control the three actuators according to the detection data in the absence of actual ingestion actions of the patient; and
- controlling three actuators by the controller to actuate the three transmission elements individually and sequentially, with a rest period between successive actions of the three load transmission elements, to transmit vibration energy from the three actuators to the patient's periodontal tissues of the anterior teeth, the left posterior teeth, and the right posterior teeth.

14. The method as claimed in claim 13, wherein the detection appliance further detects occlusal forces and frequencies of the upper and lower anterior teeth when cutting food and the upper and lower posterior teeth on the left and right sides of the mouth when chewing food, and the detection data also includes the occlusal force and frequency of each ingestion action.

15. The method as claimed in claim 13, wherein the loading appliance further comprises:
- a mouthpiece adapted to fit in a space between the patient's upper and lower dental arches and having a U-shaped structure that conforms to the shape of the upper and lower dental arches, wherein the three load transmission elements are inserted into the mouthpiece and are spaced apart from each other.

16. The method as claimed in claim 13, wherein the loading appliance further comprises:
- three teeth segments adapted to fit in a space between the upper and lower anterior teeth, a space between the upper and lower posterior teeth on the left side of the patient's mouth and a space between the upper and lower posterior teeth on the right side of the patient's mouth, respectively, wherein the three teeth segments are separated from each other, wherein the three load transmission elements are in contact with the three teeth segments, respectively.

* * * * *